United States Patent [19]

Easterbrook et al.

[11] Patent Number: 4,934,170
[45] Date of Patent: Jun. 19, 1990

[54] FATIGUE LIFE ENHANCEMENT OF NONCIRCULAR OPENINGS

[75] Inventors: Eric T. Easterbrook, Kent; Michael A. Landy, Bellevue, both of Wash.

[73] Assignee: Fatigue Technology, Incorporated, Seattle, Wash.

[21] Appl. No.: 312,634

[22] Filed: Feb. 16, 1989

[51] Int. Cl.$^5$ ............................................. B21D 19/08
[52] U.S. Cl. ........................................ 72/370; 72/392; 72/393
[58] Field of Search ................ 72/370, 391, 392, 393; 29/DIG. 49

[56] References Cited

U.S. PATENT DOCUMENTS

| | | | |
|---|---|---|---|
| 428,416 | 5/1890 | Riley | 72/393 |
| 493,108 | 3/1893 | McAusland | 72/393 |
| 2,401,834 | 6/1946 | Liddicoat | 72/392 |
| 3,566,662 | 3/1971 | Champoux | 72/370 |
| 4,554,817 | 11/1985 | Dier | 72/393 |

Primary Examiner—Lowell A. Larson
Attorney, Agent, or Firm—Delbert J. Barnard

[57] ABSTRACT

A noncircular opening is formed in a material. A mandrel or mandrel and expansion sleeve are used for coldworking a circular region of the noncircular opening, and for forcing a hard metal insert into coldworking contact with the material immediately bordering the remaining portion of the noncircular opening. An insert may be placed within a slot to form with a circular closed end of the slot a substantially circular opening. An expansion sleeve is placed in the opening and an expansion mandrel is pulled through it, or an expansion mandrel is used alone in the opening, to coldwork the circular region of the opening. An insert may be placed within an opening and then a mandrel moved through an expansion sleeve placed in a circular opening in the insert, or a mandrel alone may be moved through the opening, to radially expand the insert and coldwork the material bounding the noncircular opening.

21 Claims, 4 Drawing Sheets

FATIGUE LIFE ENHANCEMENT OF NONCIRCULAR OPENINGS

DESCRIPTION

1. Technical Field

This invention relates to the manufacture of machine or product components which include noncircular openings. More particularly, it relates to a method and apparatus for enhancing the fatigue life of the component material immediately bounding such openings.

2. Background Art

Most structural components include stress concentrations at notches, fillets, slots, radii cutouts and holes in the component material. The fatigue and crack growth life of holes can be significantly improved by cold-expanding the material immediately bounding the holes. Technical tooling and techniques for cold-expanding circular openings are disclosed, for example, in U.S. Pat. No. 4,557,033, granted Dec. 10, 1985, to Robert L. Champoux. Life-enhancement techniques for noncircular stress concentrations have been traditionally limited to surface treatments such as shot opening, roller burnishing, coining, etc. These methods create relatively shallow zones of residual compressive stresses, are often sensible to manufacturing variables, and are dependent on the proficiency of the operator. The cold-expansion process, involving the pulling of a cold-expansion mandrel through a circular opening, either alone or through a cold-expansion sleeve positioned in the opening, is known to be a reliable and effective method of material life enhancement, is insensitive to manufacturing variables, and is independent of operator proficiency.

The principal object of this invention is to use a mandrel (solid or split) only cold-expansion technique or a mandrel and sleeve cold-expansion technique, for life enhancement of noncircular openings.

DISCLOSURE OF THE INVENTION

In accordance with an aspect of the invention, a noncircular opening is provided in a material and said noncircular opening includes a circular region. An insert is inserted into a portion of the opening. The insert includes a concave surface which together with the circular region of the opening defines a substantially circular opening. A generally tubular cold-expansion sleeve is positioned on a reduced diameter intermediate portion of a cold-expansion mandrel. The mandrel includes an increasing diameter portion axially outwardly of the intermediate portion and a maximum diameter portion axially outwardly of the increasing diameter portion. The mandrel and sleeve are inserted into the substantially circular opening from one side of the material. Then the sleeve and the hard metal insert are held in place within the opening and the mandrel is retracted through the sleeve. As the mandrel is retracted, the increasing and maximum diameter portions of the mandrel expand the sleeve radially to prestress the circular region of the material immediately contacted by the sleeve. The method of the invention is usable for coldworking material bounding a circular closed end region of a slot opening. A hard metal insert is used which extends into the slot and has a concave end portion of circular curvature directed towards the circular closed end of the slot. The method of the invention is also usable for cold-expanding material bounding a closed noncircular opening which includes a circular region and an adjunctive region. The insert is sized to substantially fill the adjunctive region.

According to an aspect of the invention, an insert sized to fit within an adjunctive region of a closed opening has a concave surface substantially contacting and substantially conforming in curvature to an outer surface portion of the sleeve. Such insert may also include a slot or break which extends away from the sleeve and includes an open end which breaks the concave surface and a closed opposite end. The slot or break is of sufficient length so that expansion of the sleeve causes some expansion of the insert laterally of the slot. In this embodiment, the movement of the mandrel through the sleeve displaces the insert into coldworking engagement with material bounding the opening that is contacted by the insert.

According to the invention, a mandrel only can be used in place of a mandrel and sleeve.

Other objects, features and advantages of the invention are hereinafter described as part of the description of the best mode.

BRIEF DESCRIPTION OF THE DRAWINGS

In the drawings, like reference numerals are used throughout the several views, and.

BEST MODE FOR CARRYING OUT THE INVENTION

Figures 1, 2, 3:
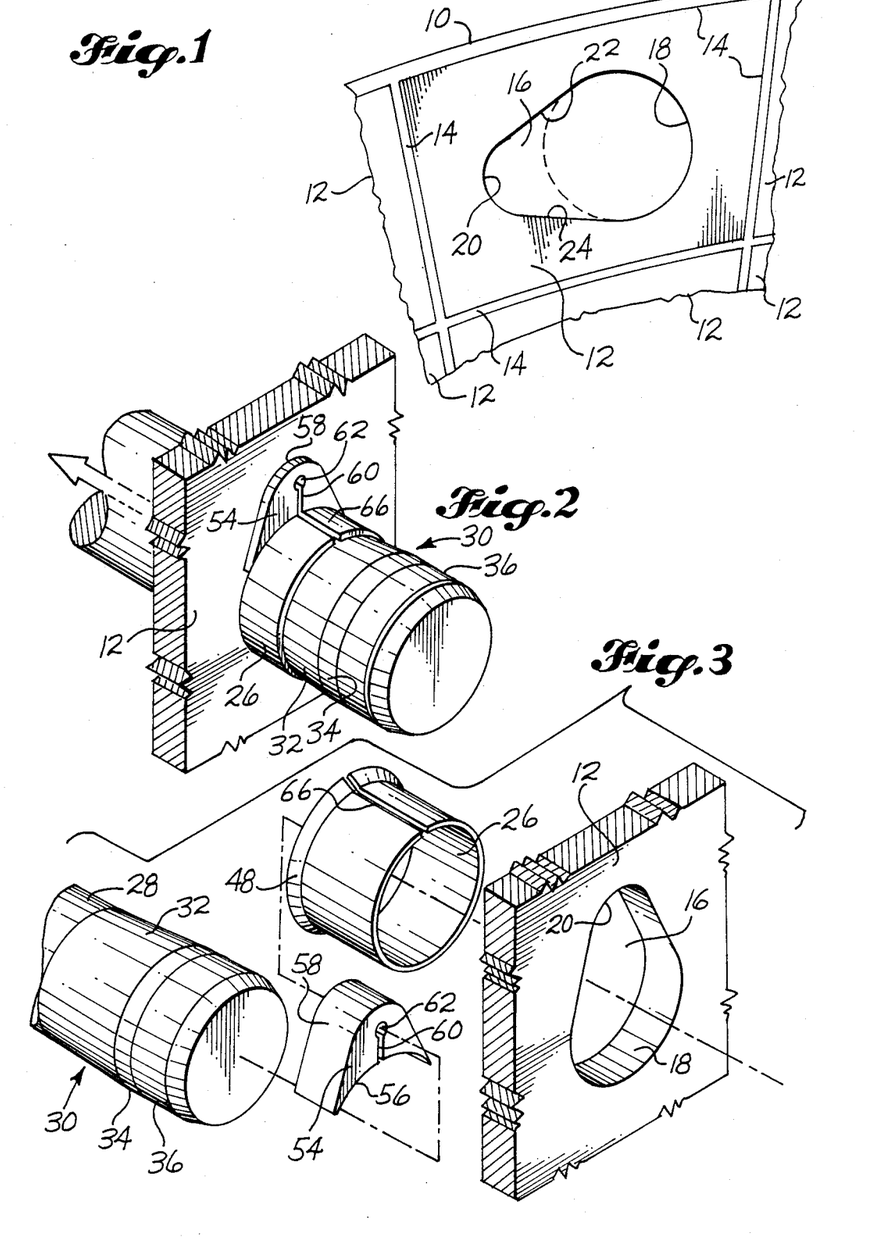
FIG. 1 is an enlarged scale fragmentary view of a panel region which includes a generally pear-shaped opening.
FIG. 2 is a fragmentary pictorial view of a mandrel in the process of being pulled through a sleeve that is positioned in a circular region of the pear-shaped opening, for expanding the sleeve to prestress material contacted by the sleeve and to displace a hard metal insert that is in an adjunctive region of the opening to prestress material contacted by said insert.
FIG. 3 is an exploded pictorial view of the components of FIG. 2.
Figures 4, 5, 6, 7:
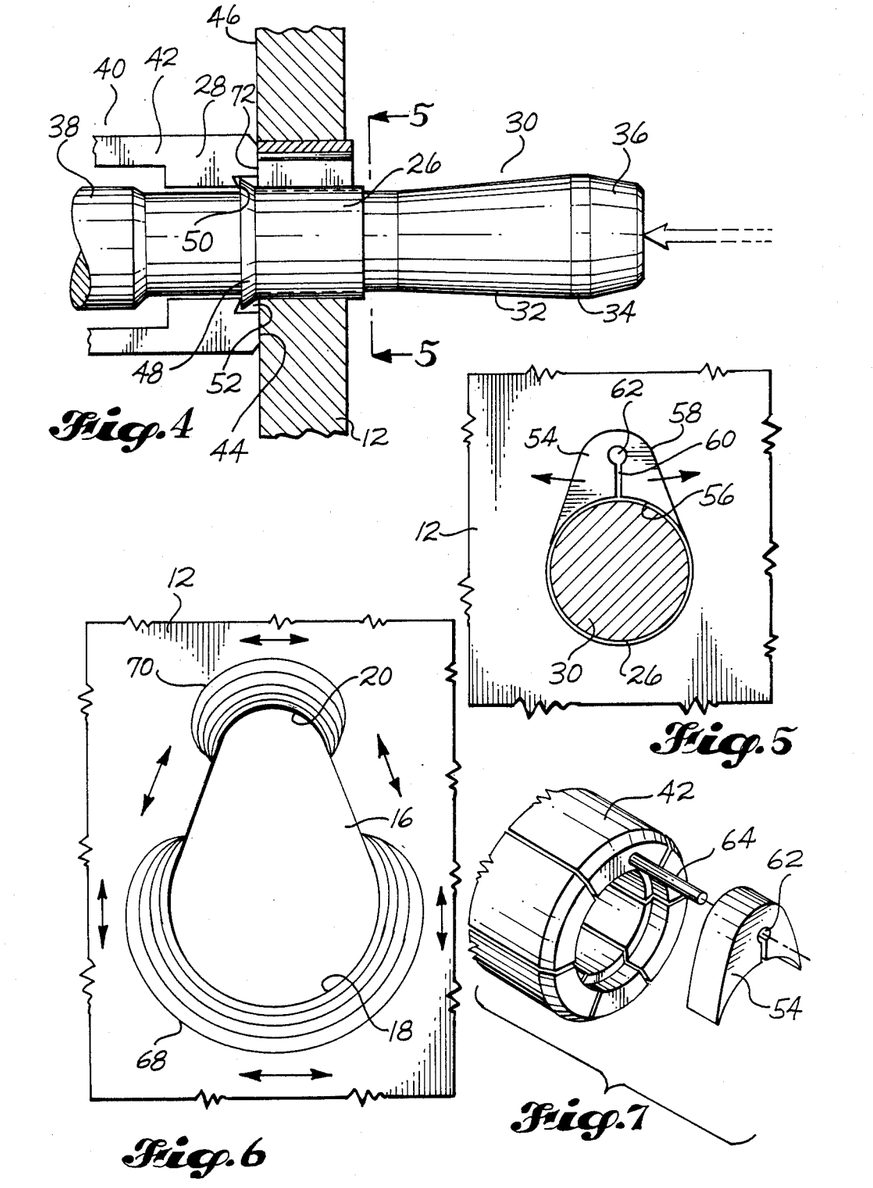
FIG. 4 is a fragmentary elevational view of the sleeve and mandrel, with the nosepiece of a puller gun, the hard metal insert and the panel being shown in section, such view showing the sleeve positioned on an intermediate portion of the mandrel, and showing the nosepiece positioned to hold the sleeve and the insert in the opening.
FIG. 5 is a sectional view taken substantially along 5—5 of FIG. 4.
FIG. 6 is an enlarged scale view of the opening following the prestressing, showing zones of residual compressive stresses in the material formed by the sleeve and the insert.
FIG. 7 is a fragmentary isometric view of the nose cap and the insert, showing a support pin on the nose cap which fits into a circular opening at the base of the slot in the insert.

By way of typical and therefore nonlimitive example, FIG. 1 shows a fragmentary portion of a bulkhead 10 which includes panels or webs 12 and ribs 14. A web 12 has been chosen which includes a noncircular opening 16. This particular opening 16 may be described as pear-shaped. It comprises a large diameter circular region 18 and a smaller diameter circular region 20 which are interconnected by straight sides 22, 24. Sides 22, 24 extend at a tangent to the two circles 18, 20. According to an aspect of the invention, this type of opening can be coldworked for life enhancement in the following manner:

Firstly, the opening 16 is formed in the web 12. Then, an expansion sleeve 26 is positioned onto a reduced diameter portion 28 of an expansion mandrel 30. Referring to FIG. 4, expansion mandrel 30 includes an increasing diameter portion 32 axially outwardly of the reduced diameter portion 28. It also includes a maximum diameter portion 34 axially outwardly of the increasing diameter portion 32. It may also include a tapered outer end portion 36. The opposite or inner end portion 38 of the mandrel 30 is secured within a puller gun 40 to a member which is alternately pushed and pulled by operation of a piston-cylinder actuator which is also located within the puller gun 40. The mandrel 30 extends forwardly from the puller gun 40 through a nose piece 42 which is constructed to allow it to expand in response to a retraction of the increasing and maximum diameter portions 32, 34 into the nose piece 42.

The maximum diameter portion 34 of hte mandrel 30 is sized to pass freely throuqh the circular region 18 of the opening 16. The outside diameter of the expansion sleeve 26 is sized to also pass through the circular region 16 when the sleeve 26 is on the reduced diameter portion 28 of the mandrel 30. This construction allows the mandrel and sleeve to be inserted into the circular region 18 of opening 16 from one side of the web or workpiece 12.

According to an aspect of the invention, the sleeve carrying mandrel is inserted through the circular region 18 of opening 16 and the puller gun 40 is moved forwardly to position the end surface 44 of its nose piece 42 in contact with surface 46 of workpiece 12. At the same time, a flared base 48 of the expansion sleeve 26 is in contact with, and is supported by, the base surface 50 of a recess 52 formed in the end of nose piece 42. A hard metal insert 54 is positioned within what is herein referred to as the adjunct portion of opening 16. This is the remaining portion of opening 16 which is to one side of the circular portion 18. Insert 18 is of a thickness at least as thick as the workpiece 12. It concludes a concave surface 56 which substantially conforms in curvature to the circular region 18 and with the circular region 18 defines a complete substantially circular opening. Insert 54 also includes a peripheral portion 58 which confronts the material boundary of the adjunct portion of opening 16. Insert 54 preferably also includes an expansion break 60, shown in the form of the slot, which extends radially and has a circular opening 62 at its inner end.

As shown by FIG. 7, the nose piece 42 may include an axial pin 64 sized to fit within the opening 62. Engagement of the pin 54 and the opening 52 may be used for positioning the insert 54 on the puller gun 40, above the expansion sleeve 26, so that the mandrel 30, sleeve 26, and insert 54 can be inserted together into the opening 16.

Following insertion of these components into the opening 16, the hydraulic mechanism in the puller gun is operated to pull the mandrel 30 rearwardly through the expansion sleeve 26. Expansion sleeve 26 includes an axial break or slot 66 which allows the sleeve 26 to expand radially in response to the axial movement through it of first the increasing diameter portion 32 and then the maximum diameter portion 34 of the mandrel 30. The movement of the mandrel 30 through the sleeve 26, and the radial expansion of the sleeve 26 in response to such movement, causes a lateral displacement of the side portions of the sleeve, away from the break 60 and also causes a radial displacement of the insert 54 relative to the sleeve 26. This movement of the insert 54 imposes life enhancing compressive stresses into the material immediately bounding the adjunct region of opening 16, and in particular provides valuable life enhancement to the small end portion of the opening 16. The expanding sleeve 26 imposes life enhancing compressive stresses into the material immediately bounding the circular region 18.

FIG. 6 includes a general pattern of the regions of residual compressive stresses which are formed in the opposite end portions of the opening 16, by practice of the above described technique of cold-working the material bounding the opening 16.

As is known, and is shown by FIG. 4, when the mandrel 30 is being retracted by the puller gun 40, the nose piece 42 of the puller gun 40 is drawn tight against surface 46 of the workpiece 12. The contact of the sleeve base 48 with surface 50 within end piece recess 52 holds the sleeve 26 within the circular portion of the opening 16. Contact is also made between end surface 44 of end piece 42 and a confronting surface portion 72 of the insert 54. Accordingly, insert 54 is also restrained against movement out from the adjunct region of opening 16. The movement of the mandrel portions 32, 34 through the sleeve 26 wants to move the sleeve 26 endwise in th edirection of the puller gun 40. However, the pull on th emandrel is reacted by the nose piece 42 against the workpiece 12 and also against the base portion 48 of the sleeve 26. For this reason, sleeve 26 will not move out from the hole. This results in sleeve 26 only imposing radial forces on the insert 54. Accordingly, there is essentially no forces acting on insert 54 tending to remove it from its regions of the opening 16. In any event, movement of the insert 54 is prevented by contact between nose piece end surface 44 and the insert 54 at surface 72.

Figures 8, 15:
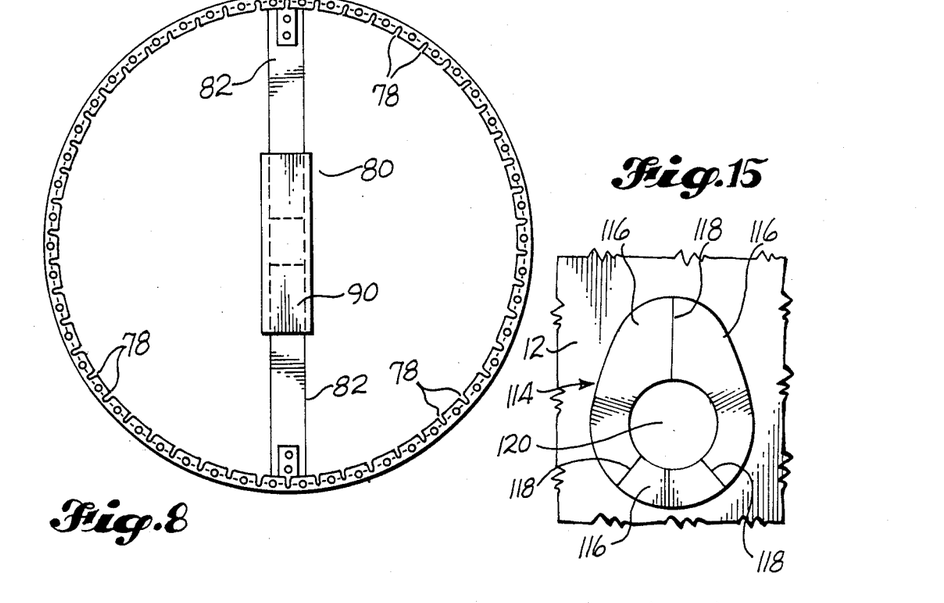
FIG. 8 is an elevational view of a second form of insert used to recreate a round hole at the rounded end of a slot opening, to permit use of split sleeve or mandrel only cold-expansion for fatigue life enhancement of the closed end of the slot opening.
FIG. 15 is an elevational view of another noncircular opening and insert.
Figures 9, 10, 16:
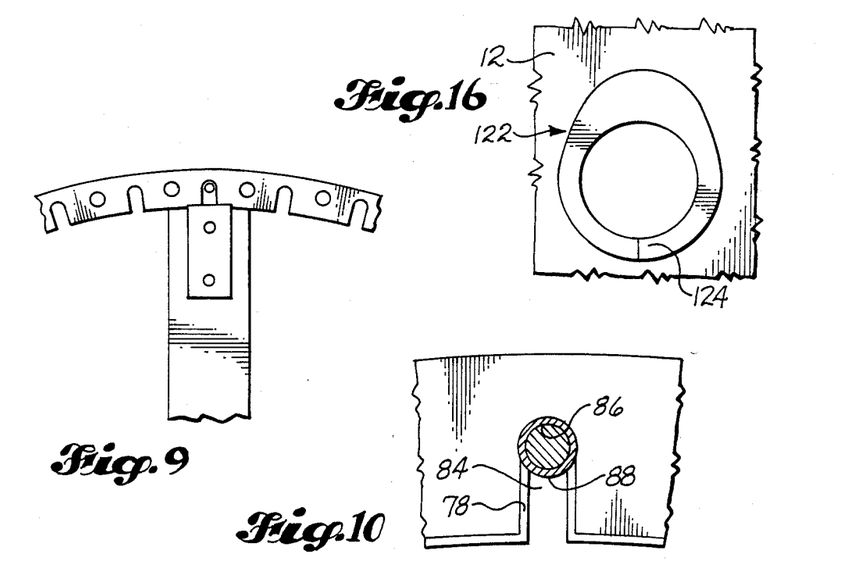
FIG. 9 is an enlarged scale fragmentary view showing the insert of FIG. 8 within the slot opening.
FIG. 10, is a view at the slot opening on yet a larger scale, showing in section a split sleeve in the created round hole and, a mandrel within the split sleeve.
FIG. 16 is an elevational view of yet another noncircular opening and insert.

FIGS. 8-10 illustrate a second embodiment of the invention. FIG. 8 shows a ring structure 76 having a plurality of radially inwardly directed slots, some of which are designated 78. The particular structure that is illustrated is a scalloped compressor disk bore. In this embodiment, a fixture 80 is positioned within the bore. Fixture 80 has opposite end members 82, each of which carry a slot insert 84. The outer end region of one of the members 82, and the insert 84 carried by it, are shown by FIG. 9. FIG. 10 shows an enlarged view of the insert 84. In this embodiment, the noncircular opening is a slot 78. The closed end portion 86 of each slot 78 is of circular configuration. The insert 84 has a circular end portion 88. When the insert 84 is within a slot 78, the curved end portion 88 of the insert 84 and the curved closed end of the slot 78 together define a substantially circular opening. A mandrel only, or a mandrel carrying an expansion sleeve, is forced through this substantially circular opening and utilized for radially expanding the ring material immediately bounding the circular region of the slot 78. The cold-expansion procedure utilizing a cold-expansion sleeve would be like the procedure described above in connection with FIGS. 2-5. The mandrel only technique is described below in connection with FIG. 17.

The fixture 80 is shown to span across the diameter of the ring 76. Th einner end portions of the members 82 make telescopic engagement with a center member 90. The members 82 can be retracted into member 90 to make the fixture 80 fit within the disk bore. Then, the members 82 can be extended outwardlY to place the inserts 84 within the slots 78. Then, the members 82 can be secured to the member 90, such as by the use of bolts, etc. This arrangement results in the expansion forces of the mandrel and/or mandrel and sleeve on the insert 84 being reacted on the ring member 76 via the fixture 80. Of course, the insert 80 may be supported in any suitable manner so that it will be supported when the mandrel is moved through the opening that has been created, or through an expansion sleeve that has been placed in such opening.

Figure 11:
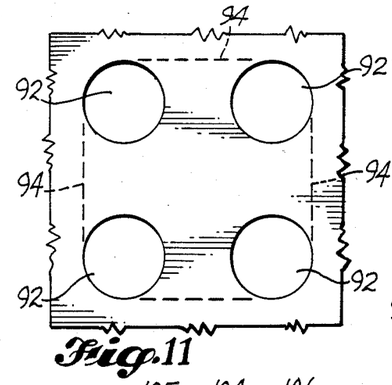
FIG. 11 shows a pattern of four circular openings drilled at the corner regions of what will become the generally square opening, such view including cut lines extending between the openings.
Figure 12:
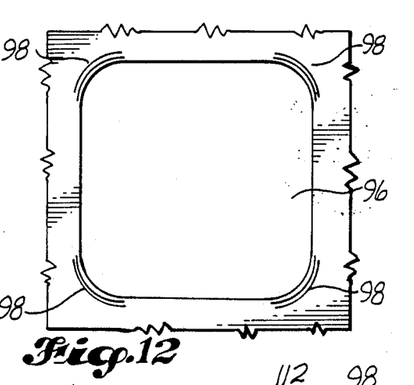
FIG. 12 is a view of the substantially square opening that is formed when the material is cut at the cut lines indicated in FIG. 11, with zones of residual compressive stresses shown in the corner regions of the opening.
Figure 13:
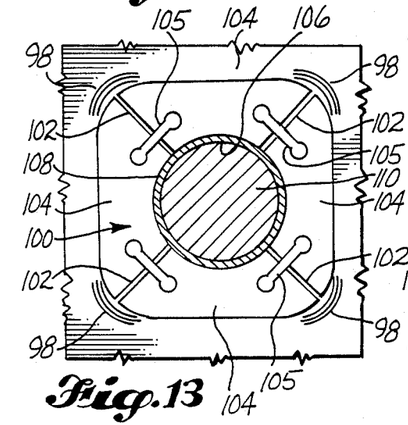
FIG. 13 is a view of the opening shown in FIG. 12, with an expandable hard metal insert positioned within the opening, and with an expansion sleeve positioned within a circular opening formed in the insert and an expansion mandrel positioned within the expansion sleeve.

FIGS. 11-14 illustrate another example of the life-enhancement technique of the invention. Referring to FIG. 11, four circular openings 92 are drilled at the four corners of a square or rectangular region 92. Then, each of the openings 92 is cold-worked, either by a mandrel alone, or by a mandrel and sleeve, then, the material between the holes is cut away by making cuts along the line 94. FIG. 12 shows the opening 96 that is produced. This opening has a region 98 of residual compressive stress at each of its four corners. Next, a segmented insert 100 is placed within the opening. This insert is divided by breaks 102 into segments 104. The insert 100 is sized to snugly fit within the opening 96. Insert 100 includes a central circular opening 106. The breaks 102 extend radially outwardly from this opening 106. Expansion sleeve 108 is placed within the opening and a mandrel 110 is forceably moved through the sleeve 108. Or, a mandrel alone is forceably moved through the opening 106.

Figure 14:
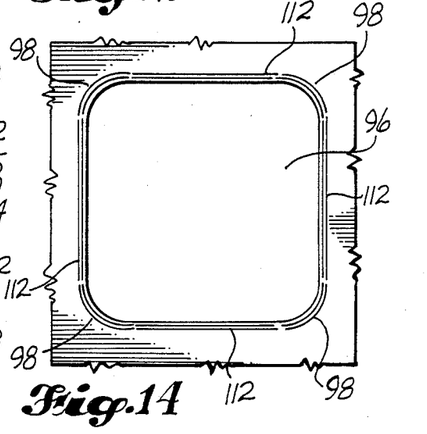
FIG. 14 is a view of the hole following use of the mandrel and sleeve to expand the insert for the purpose of cold-working the four side regions of the opening.

The mandrel 110 has an increasing diameter section and a maximum diameter section as described above in connection with FIG. 4. As it is moved, either alone or through a sleeve, the increasing diameter and maximum diameter regions act on the insert segments 104 and force them radially outwardly, to in this manner impose residual compressive stresses in the material which directly bounds the four side regions of the opening 96. The segments 104 may be connected together by elastomeric keys 105 which stretch to allow the segments to move. FIG. 4 shows the opening 96 following first the cold-working of the corner regions and then the corner working of the side regions. This figure shows residual compressive stress regions 98 at the corner and residual compressive stress regions 112 at the sides of opening 96.

Figure 17:
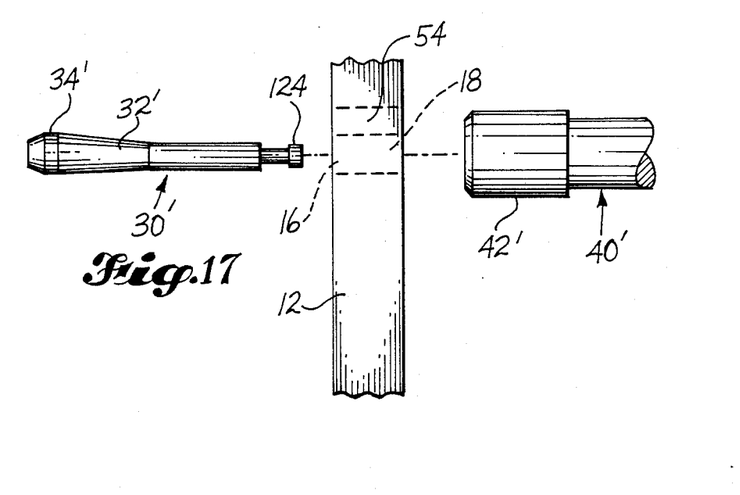
FIG. 17 is an exploded side elevational view of tooling used to cold-expand by use of a mandrel only.

FIGS. 16 and 17 are elevational views of additional embodiments of hard metal inserts for use to cold-expand noncircular openings.

Referring to FIG. 16, the insert 114 is constructed to be in the shape of the opening, much like insert 100. It comprises a plurality of segments 116 which are separated by breaks 118. Insert 114 includes a central opening 120 which is generally circular. A mandrel alone or a mandrel and sleeve are used for expanding the insert 114 radially to in this manner apply compressive forces on the material immediately bounding the opening in which the insert is placed.

Referring to FIG. 17, the insert 122 is constructed to snugly fit within the noncircular opening. This insert 122 includes a single break 124 extending radially outwardly from a central opening 126. Again, a mandrel alone or a mandrel and sleeve are used for expanding the insert 122 to in this manner cold-work the material immediately surrounding the opening in which the insert 122 is placed.

As previously stated, a mandrel only technique can also be used for coldworking the circular holes or hole portions and displacing the insert. FIG. 17, shows a mandrel only technique which utilizes a puller gun 40' and a solid mandrel 30'. In the above described sleeve/mandrel technique, the maximum diameter portion 34 of the mandrel 30 is smaller in diameter than the opening portion 18. As a result, the mandrel and sleeve can be inserted into the opening portion 18 from the puller gun side of the opening portion 18. The mandrel 30' used in practicing the mandrel only technique must have a maximum diameter portion 34' which is larger in diameter than the opening portion 18. As a result, it is necessary that access be had to the side of the workpiece 12 opposite the puller gun 40' so that the secured end 124 of the mandrel 30' can be inserted through the opening portion 18 and then into the nose cap 42' of the puller gun 40'. Within the nose cap 42', the end member 124 is coupled to a reciprocating member which is in turn coupled to the extend/retract cylinder. Following connection of the mandrel 30' to the puller portion of the puller gun 40', the puller gun 40' is operated to pull the mandrel 30' through the opening portion 18. The increasing diameter and maximum diameter portions 32', 34' of the mandrel 30' are lubricated to allow them to slide through the opening portion 18. As mandrel portions 32', 34' move successfully through the opening portion 18, they expand the metal radially and in this manner create a zone of residual compressive stresses in the workpiece material immediately bounding the opening portion 18. They also radially displace the insert 54. Split mandrel techniques are known and could be used.

It is to be understood that the apparatus and technique which has been described are merely examples of the apparatus and technique of the invention and coverage is not to be limited by such examples but only by the appended claims interpreted in accordance with established rules of patent claim interpretation, including use of the doctrine of equivalents.

What is claimed is:

1. A method of coldworking material bounding a circular region of a noncircular opening in the material, said method comprising:

inserting into the opening adjacent the circular region of the opening a hard metal insert having a concave surface, with said concave surface of the hard metal insert and said circular region of the opening together defining a substantially circular opening;

positioning a generally tubular cold-expansion sleeve onto a reduced diameter intermediate portion of a cold-expansion mandrel, said mandrel including an increasing diameter portion axially outwardly of said intermediate portion, and a maximum diameter portion axially outwardly of said increasing diameter portion;

inserting the mandrel and the sleeve into the substantially circular opening from one side of the material;

holding said sleeve and said hard metal insert within said opening; and retracting the mandrel through the sleeve, so that as the mandrel is retracting the increasing and maximum diameter portions of the mandrel expand the sleeve radially to prestress the circular region of the material immediately contacted by said sleeve.

2. A method according to claim 1, wherein the noncircular opening is a slot having a concave, substantially circular closed end region, and the hard metal insert extends into the slot and has a concave end portion of circular curvature directed towards the circular closed end of the slot.

3. A method according to claim 1, wherein said noncircular opening is a closed opening defined by the circular region and an adjunctive region, and said hard metal insert is sized to substantially fill the adjunctive region.

4. A method of cold-expanding material which bounds a noncircular opening in the material, said opening including a circular region and an adjunctive region, and said method comprising:

positioning a generally tubular cold-expansion sleeve onto a reduced diameter intermediate portion of a cold-expansion mandrel, said intermediate portion being axially inwardly of an increasing diameter portion, and a maximum diameter portion of said mandrel extending axially outwardly of said increasing diameter portion;

inserting the mandrel and sleeve into the circular region of the opening from one side of the material;

inserting into the adjunctive region of the opening a hard metal insert which is sized to substantially fill the adjunctive region and which includes a concave surface substantially contacting and substantially conforming in curvature to an outer surface portion of said sleeve;

holding said sleeve and said hard metal insert within said opening; and retracting the mandrel through the sleeve, so that as the mandrel is retracting the increasing and maximum diameter portions of the mandrel expand the sleeve radially to prestress the material immediately contacted by said sleeve and at the same time displace the insert transversely of the sleeve to prestress material immediately contacted by the insert.

5. A method according to claim 4, comprising retracting the mandrel by use of a mandrel pull gun and holding the sleeve and the insert into the opening by means of an end piece on the pull gun.

6. A method of cold-expanding material which bounds a noncircular opening in the material, said opening including a circular region and an adjunctive region, and said method comprising:

positioning a generally tubular cold-expansion sleeve on a reduced diameter intermediate portion of a cold-expansion mandrel, said intermediate portion being axially inwardly of an increasing diameter portion, and a maximum diameter portion of said mandrel extending axially outwardly of said increasing diameter portion;

inserting the mandrel and sleeve into the circular region of the opening from one side of the material;

inserting into the adjunctive region of the opening a hard metal insert which is sized to substantially fill the adjunctive region and which includes a concave surface substantially contacting and substantially conforming in curvature to an outer surface portion of the sleeve, and which further includes a slot extending away from the sleeve and having an open end which breaks the concave surface and a closed opposite end;

holding said sleeve and said hard metal insert within said opening; and retracting the mandrel through the sleeve, so that as the mandrel is retracting the increasing and maximum diameter portions of the mandrel expand the sleeve radially to prestress the material immediately contacted by said sleeve and at the same time displace the insert transversely of the sleeve and expand the insert transversely of the slot to prestress material immediately contacted by the insert.

7. A method according to claim 6, comprising retracting the mandrel by use of a mandrel pull gun and holding the sleeve and the insert into the opening by means of an end piece on the pull gun.

8. Apparatus for cold-expanding a circular region of a noncircular opening in a material, said apparatus comprising:

a cold-expansion mandrel having an intermediate portion, an increasing diameter portion extending axially from the intermediate portion, and a maximum diameter portion extending axially outwardly of the increasing diameter portion;

a generally tubular cold-expansion sleeve positionable on said intermediate portion and sized to fit through the circular region of the opening when on said intermediate portion and it and the mandrel are inserted through the opening from one side of the material;

a hard metal insert which is sized to fit into said opening and which includes a concave surface of circular curvature directed towards the circular region of the opening and with said circular region defines a substantially circular opening;

means for holding the sleeve and the hard metal insert within said opening; and means for retracting the mandrel through the sleeve, so that as the mandrel is retracted, the increasing and maximum diameter portions of the mandrel expand the sleeve radially to prestress the material immediately contacted by said sleeve.

9. Apparatus according to claim 8, wherein the noncircular opening is a slot and the circular region is a circular closed end of the slot, and the hard metal insert fits within the slot and presents its concave surface towards the circular closed end of the slot.

10. Apparatus for cold-expanding material which bounds a noncircular opening in the material, said opening including a circular region and an adjunctive region, said apparatus comprising:

a cold-expansion mandrel having an intermediate portion, an increasing diameter portion extending axially outwardly from the intermediate portion, and a maximum diameter portion extending axially outwardly of the increasing diameter portion;

a generally tubular cold-expansion sleeve positionable on said intermediate portion and sized to fit through the circular region of the opening on said intermediate portion and when it and the mandrel are inserted through the opening from one side of the material;

a hard metal insert which is sized to substantially fill the adjunctive region of the opening following insertion of the mandrel and sleeve into the circular region of the opening, said insert including a concave surface substantially contacting and substantially conforming in curvature to the outer surface portion of the sleeve;

means for holding the sleeve and the hard metal insert within said opening; and means for retracting the mandrel through the sleeve, so that as the mandrel is retracting the increasing and maximum diameter portions of the mandrel expand the sleeve radially to prestress the material immediately contacted by said sleeve and at the same time displace the insert transversely of the sleeve to prestress material immediately contacted by the insert.

11. Apparatus according to claim 10, wherein the hard metal insert includes a slot extending away from the sleeve, said slot having an open end which breaks the concave surface and a closed outer end, and said slot being of sufficient length so that expansion of the sleeve causes some expansion of the insert laterally of the slot.

12. Apparatus according to claim 10, wherein the adjunctive region of the opening has a rounded end and diverging opposite sides which extend tangentially from the rounded end to tangentially meet the circular region of the opening, and the insert includes a slot which extends outwardly from the concave surface and has an open end which breaks the concave surface and a closed opposite end.

13. Apparatus according to claim 10, wherein the means for retracting the mandrel through the sleeve is a puller gun and the means for holding the sleeve and the hard metal insert within the opening is a nose piece at the end of the puller gun.

14. Apparatus for cold-expanding rounded outer end portions of inwardly opening radial slots in a ring structure, said apparatus comprising:

a hard metal insert which is sized to fit within a said slot and which includes a concave outer surface portion substantially conforming in curvature to the circular closed end of the slot, to define with said circular closed end of the slot a substantially circular opening;

means for holding the hard metal insert in position within said slot;

a cold-expansion mandrel having an intermediate portion, an increasing diameter portion extending axially from the intermediate portion, and a maximum diameter portion extending axially outward of the increasing diameter portion;

a generally tubular cold-expansion sleeve positionable on said intermediate portion and sized to fit through the substantially circular opening formed by the circular closed end region of the slot and the concave surface of the hard metal insert, when said sleeve is on said intermediate portion of the mandrel and the sleeve and mandrel are inserted through the opening from one side of the ring;

means for holding the sleeve within said opening; and means for retracting the mandrel through the sleeve, so that as the mandrel is retracting the increasing and maximum diameter portions of the mandrel expand the sleeve radially to compress the material at the circular outer end region of the slot which is immediately contacted by the sleeve.

15. Apparatus according to claim 14, further comprising a support structure for the hard metal insert spanning the interior of said ring, said hard metal insert being mounted at one end of said support member.

16. A method of cold-expanding material which bounds a noncircular opening in a panel of said material, comprising:

positioning within said noncircular opening a hard metal insert which is sized to substantially fill the noncircular opening and has outer edge portions which are contiguous the material boundary of the opening, said insert including a substantially cylindrical opening and at least one expansion break extending radially from the opening;

forceably moving an expansion mandrel axially through the substantially cylindrical opening in the insert, to expand the insert within the noncircular opening and in that manner create regions of residual compressive stresses in the panel material immediately surrounding the noncircular opening in said panel, for fatigue life enhancement of the material in the region of the noncircular opening.

17. A method of cold-expanding material which bounds a noncircular opening in the material, comprising:

positioning within said noncircular opening a hard metal insert which is sized to substantially fill the noncircular opening and has outer edge portions which are contiguous the material boundary of the opening, said insert including a substantially circular opening and expansion breaks;

positioning a generally tubular cold-expansion sleeve into the substantially circular opening in the insert; and forceably moving the mandrel through said sleeve, to expand the sleeve against the insert to expand the insert within the noncircular opening and in that manner create regions of residual compressive stresses in the material immediately surrounding the noncircular opening for fatigue life enhancement of the material in the region of the noncircular opening.

18. Apparatus for cold-expanding material which surrounds a noncircular opening in a panel of said material, said apparatus comprising:

a hard metal insert which is sized to substantially fill said noncircular opening, said insert including peripheral portions which substantially conform in shape and size to the noncircular opening in the material and which confront the boundary surfaces of the noncircular opening in the material, said insert including at least one expansion break dividing it into segments, and further including a substantially cylindrical opening; and means including a mandrel having increasing and maximum diameter portions, for expanding the insert to cause the insert to coldwork the material of said panel immediately bounding the noncircular opening in said panel, said increasing diameter portion of said mandrel preceding the maximum diameter portion as the mandrel moves through the substantially cylindrical opening.

19. Apparatus for cold-expanding material which surrounds a noncircular opening in the material, said apparatus comprising:

a hard metal insert which is sized to substantially fill said noncircular opening, said insert including peripheral portions which substantially conform in shape and size to the noncircular opening in the material and which confront the boundary surfaces of the noncircular opening in the material, said insert including at least one expansion break, and further including a substantially circular opening;

a generally tubular cold-expansion sleeve positionable within the substantially circular opening in the insert; and means including a mandrel having increasing and maximum diameter portions, for expanding the sleeve and insert to cause the insert to coldwork the material immediately bounding the noncircular opening in the material said mandrel being adapted to be forced endwise through the sleeve to in that manner expand the sleeve, causing the sleeve to in turn expand the insert.

20. Apparatus according to claim 19, wherein the insert comprises a plurality of breaks extending radially outwardly from the substantially circular opening in the insert, dividing the insert into segments, and said insert includes means for holding the segments relatively together, but allowing their outward movement in response to movement of an expansion mandrel relatively through the substantially circular opening.

21. Apparatus for cold-expanding material which surrounds a noncircular opening in the material, said apparatus comprising:

a hard metal insert which is sized to substantially fill said noncircular opening, said insert including peripheral portions which substantially conform in shape and size to the noncircular opening in the material and which confront the boundary surfaces of the noncircular opening in the material, said insert including a single expansion break extending radially outwardly from the substantially circular opening, and further including a substantially circular opening; and means including a mandrel having increasing in maximum diameter portions, for expanding the insert to cause the insert to coldwork the material immediately bounding the noncircular opening in the material.

* * * * *